(No Model.)

J. TIMMONS.
INSERTIBLE SAW TOOTH.

No. 341,187. Patented May 4, 1886.

WITNESSES:
Edward Wolff
William B. Ellison

INVENTOR
John Timmons,
BY
Chas. O. Gill
ATTORNEY

N. PETERS, Photo-Lithographer, Washington, D. C.

UNITED STATES PATENT OFFICE.

JOHN TIMMONS, OF NEWARK, NEW JERSEY.

INSERTIBLE SAW-TOOTH.

SPECIFICATION forming part of Letters Patent No. 341,187, dated May 4, 1886.

Application filed September 12, 1885. Serial No. 176,888. (No model.)

*To all whom it may concern:*

Be it known that I, JOHN TIMMONS, a citizen of the United States, and a resident of Newark, in the county of Essex and State of New Jersey, have invented certain new and useful Improvements in Saws, of which the following is a specification.

The invention relates to improvements in saws; and it consists, essentially, in a novel means for securing the teeth in the body of the saw, as hereinafter particularly described.

The object of the invention is to furnish a means of applying the teeth to a saw in such manner that they may be quickly and securely inserted and locked in position, and that any special tooth may be readily withdrawn and another substituted.

The invention will be more fully understood from the detailed description hereinafter presented, reference being had to the accompanying drawings, in which—

Figure 1:
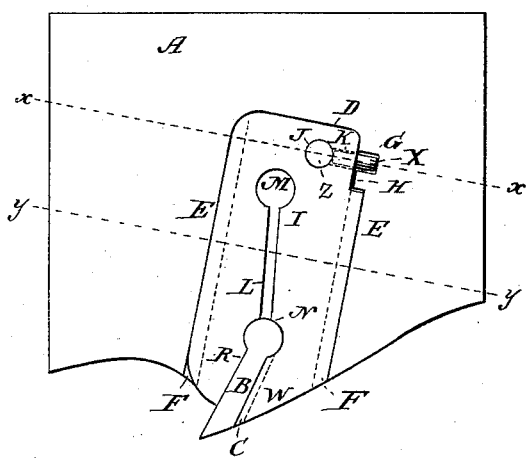
Figure 2:
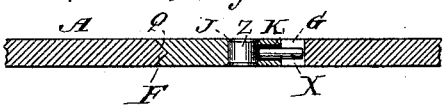
Figure 3:
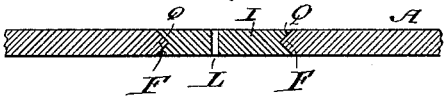

Figure 1 is a plan view of a detached portion of the saw carrying one tooth. Fig. 2 is a sectional view taken on the line *x x* of Fig. 1, and Fig. 3 is a like view taken on the line *y y* of Fig. 1.

In the drawings, A designates the body of the saw, B the tooth thereof, and I the clamp whereby the tooth is held and locked in position. The body of the saw will be of usual form and construction, and provided at definite and regular intervals along its edge with rectangular recesses D, the sides E of which are substantially parallel and on a suitable angle to give the tooth the proper inclination. The sides E of the recess are beveled on opposite edges, forming the dovetail F, while the inner end of the recess and that portion of the sides thereof adjacent to said end have plain flat surfaces.

In the right-hand side of the recess D, near its inner end, are provided the notch G and shoulder H, as shown in Fig. 1, and the purpose of which will appear hereinafter.

Within the recess D is inserted the spring tooth-clamp I, which snugly fills the recess, and is of the same thickness as the saw. In the lower right-hand corner of the clamp I, opposite to the notch G, is an aperture, J, which is met by the transverse aperture K, passing from said aperture to the said notch. The clamp I is slit at L, one end of the slit terminating in the aperture M and the other in the circular opening N in the outer end of the clamp, and which opens into the slot R, extending on an angle to the edge of the clamp, as indicated in Fig. 1. The opposite sides and inner end of the clamp I correspond in general outline with the like portions of the recess D, the sides of the clamp being grooved, as shown at Q, to receive the dovetail F, and its end being plain and bearing squarely and firmly against the plain inner end of the recess. The tooth is lettered B. Its outer end is on a suitable angle to cut properly, its sides are substantially parallel, and its inner end is circular, as shown. The tooth B fits into and fills the circular opening N and slot R formed in the clamp I, its point being properly exposed and supported by the projecting portion W of the clamp, into which the shank of the tooth is dovetailed, as indicated by dotted lines C in Fig. 1.

In the transverse aperture K is applied a pin, X, which, when the aperture J is empty, may lie across the same; but when the headed pin Z is inserted into the aperture J the transverse pin X will be moved along its aperture until its outer end enters the notch G, where it will be locked until the pin Z is removed.

The purpose of the pins X and Z is to effectually lock the clamp I in the recess D until such time as it may be desired to withdraw the same, which may be readily accomplished by removing the pin Z, when by inclining the saw the pin X will slide from the notch G and permit the withdrawal of the clamp.

When the clamp I is not in the recess D, its front end will spread more than is shown in Fig. 1, and its contraction while in the recess has the effect of binding its sides firmly against the walls of the recess.

In arranging the parts above described the pin X is first inserted in the aperture K and the clamp started into the recess D, when the tooth B will be introduced into the opening N and slot R, and the clamp driven to the end of the recess, at which time a pin, Z, of soft metal, preferably of copper, will be inserted into the aperture J and headed, thereby locking the clamp which holds the tooth in position.

What I claim as my invention, and desire to secure by Letters Patent, is—

1. The saw having the recess D and notch G, combined with the clamp I, fitting the recess, the tooth B, held in a slot cut in the clamp, the aperture J, passing through the clamp at a point opposite to the notch, the transverse aperture K, formed in the clamp and passing from the aperture J to the notch G, the pin X, movable in the aperture K, and the locking-pin Z in the aperture J, substantially as set forth.

2. The saw having on its edge the substantially-rectangular recess D, combined with the spring-clamp I, made in a single piece of metal and fitting said recess, the aperture M in the inner portion of the clamp, the slit L, extending from said aperture a suitable distance toward the outer end of the clamp, and the sides of which are separated from each other, the opening N, of greater width than and communicating with the slit L, the slot R, less in width than and extending from said opening to the outer edge of the clamp, the tooth B, the head of which fills the opening N, and the shank of which fills the slot R, and a locking device at the inner end of the clamp, for securing it in the recess D, substantially as and for the purposes set forth.

Signed at New York, in the county of New York and State of New York, this 9th day of September, A. D. 1885.

JOHN TIMMONS.

Witnesses:
CHAS. C. GILL,
EDWARD WOLFF.